(12) United States Patent
Somppi

(10) Patent No.: US 6,431,659 B1
(45) Date of Patent: Aug. 13, 2002

(54) ADJUSTABLE ANGLE SPINDLE

(75) Inventor: Kerry Arne Somppi, Cuyahoga Falls, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 09/869,846

(22) PCT Filed: Feb. 18, 1999

(86) PCT No.: PCT/US99/03487

§ 371 (c)(1),
(2), (4) Date: Jun. 29, 2001

(87) PCT Pub. No.: WO00/49381

PCT Pub. Date: Aug. 24, 2000

(51) Int. Cl.$^7$ ............................................... B60B 35/00
(52) U.S. Cl. ......................................... 301/132; 301/131
(58) Field of Search ............................ 361/124.1, 126, 361/127, 131, 132, 134

(56) References Cited

U.S. PATENT DOCUMENTS 3,401,981 A * 9/1968 Adams ........................ 301/127
3,500,937 A * 3/1970 Erickson et al. ............. 301/127
3,520,377 A * 7/1970 Wallace ...................... 301/127
4,127,306 A * 11/1978 Foster ......................... 301/127
5,226,691 A * 7/1993 Kane .......................... 301/132
6,299,259 B1 * 10/2001 MacKarvich ............... 301/127

FOREIGN PATENT DOCUMENTS

GB          2221434          2/1990     ............ B60G/1/00

* cited by examiner

*Primary Examiner*—S. Joseph Morano
*Assistant Examiner*—Long Bao Nguyen
(74) *Attorney, Agent, or Firm*—David E. Wheeler

(57) ABSTRACT

An apparatus and method for making possible an infinite variation in the adjustment angle of a spindle assembly makes possible a rapid changeover for testing the dynamic properties of elastomeric objects. In spindle assembly (10), wedge rings (18, 20) having wider portions (22, 22*a*) and narrower portions (24, 24*a*) interposed between a spindle (12) and an axle assembly (17), whereby the relative placement of the wider portions (22, 22*a*) and the narrower portions (24, 24*a*) determine the angle of the spindle (12) relative to axle assembly (17). Indicia (48, 48*a*) on the wedge rings (18, 20) make possible quick determination of the exact angle. Means (50, 50*a*, 67) may be provided to make easier rotation of the wedge rings (18, 20).

14 Claims, 9 Drawing Sheets

ADJUSTABLE ANGLE SPINDLE

TECHNICAL FIELD

The invention relates to an adjustable spindle for rotating round elastomeric objects. Specifically, the invention relates to changing the camber angle of a spindle used for rotating tires.

BACKGROUND ART

In the automotive industry, some manufacturers design their vehicles having a suspension which provides a camber to the wheels that are used on the vehicle. When developing tires for such vehicles, it is important to test an experimental tire under conditions very similar to those encountered on a vehicle. Accordingly, spindles used for spinning tires on test equipment have been adapted to provide camber to a tire during dynamic testing.

In prior art testing equipment, however, spindles providing a camber were not adjustable and could be set up only at one angle. Conversion to a different angle was possible but involved dismantling the equipment to change the angle. Even then, only a limited number of angles were possible.

Vehicle manufacturers often experiment with different camber angles on vehicles, and a large variety of vehicles are being manufactured with camber angle on the suspension systems, and it is important that tires be tested at the large number of camber angles which are used, or are considered experimentally.

It is an object of the present invention to provide an adjustable spindle which makes possible the quick adjustment of the camber angle of the spindle.

SUMMARY OF THE INVENTION

A spindle assembly (10) for rotating round objects comprises a spindle (12) and a spindle plate (14) attached to a back plate (16), the spindle plate (14) and back plate (16) having interposed there between at least two wedge rings (18,20), wedge rings(18,20) having a wider portion (22,22a) and a narrower portion (24,24a). In the assembly, when a narrower portion (24) of wedge ring (18) is adjacent to wider portion (22a) of wedge ring (20), an axis (26) of the spindle (12) is normal to the plane (28) of the back plate (16). The assembly (10) is adapted to vary the angle of an axis (26) of the spindle (12) relative to a plane (28) of the back plate (16) by rotating said at least two wedge rings (18,20) relative to each other and to said back plate (16).

Washers (32) used with bolts (30), and nuts (34) on the bolts (30) have a portion of a sphere (54) to accommodate a plurality of angles.

The at least two wedge rings (18,20) are adapted to interlock with each other circumferentially, permitting rotation relative to one another while maintaining their circumferential relationship to the back plate (16). The at least two wedge rings (18,20) each have an outside surface (40,40a) corresponding to its outside diameter and an inside surface (41,41a) corresponding to its inside diameter, and a back plate side (44,44a) oriented toward the back plate (16) and a spindle plate side (46,46a) oriented toward the spindle (12), and in the spindle assembly (10) in a wedge ring (18) closest to the back plate (16) the back plate side (44) forms a ninety degree (90°) angle with the outside surface (40), and in a wedge ring (20) closest to the spindle plate (14) the spindle plate side (46a) forms a ninety degree angle with the outside surface (40a).

The at least two wedge rings (18,20) are marked with indicia (48,48a) whereby the angle of the axis (26) of the spindle (12) relative to a plane (28) of the back plate (16) can be determined by the indicia.

In one embodiment, the back plate (16) and spindle plate (14) are attached to each other by a plurality of bolts (30), and the at least two interposed wedge rings (18,20) are free to rotate relative to the spindle plate (14) and the back plate (16) when the bolts (30) are not tightened. In a second embodiment, bearings (56) are interposed between spindle plate (14) and a wedge ring (20), and between wedge ring (20) and wedge ring (18), and between wedge ring (18) and back plate (16) and a pinion gear (67) is associated with the wedge rings (18,20) for rotating the wedge rings.

Also provided is a method for varying the camber angle of a spindle (12) having a spindle plate (14), comprising the steps of interposing at least two wedge rings (18,20) between a spindle plate (14) and a back plate (16) in a spindle assembly (10), wherein at least two of the at least two wedge rings (18,20) have a wider portion (22,22a) and a narrower portion (24,24a).

The method may comprise the further steps of (a) releasing tension between a back plate (16) and a spindle plate (14) in a spindle assembly, and (b) rotating at least two of the at least two wedge rings (18,20) independent of each other and the back plate (16), or the further steps of (a) associating a pinion gear (67) with the wedge rings (18,20), and (b) using the pinion gear (67) to change the angle of spindle (12).

The method may comprise the further step of providing indicia (48,48a) on at least two of the at least two wedge rings (18,20) whereby the exact angle of an axis (26) of the spindle (12) relative to a plane (28) of the back plate (16) can be determined from the indicia.

DETAILED DESCRIPTION OF THE INVENTION

Figure 1:
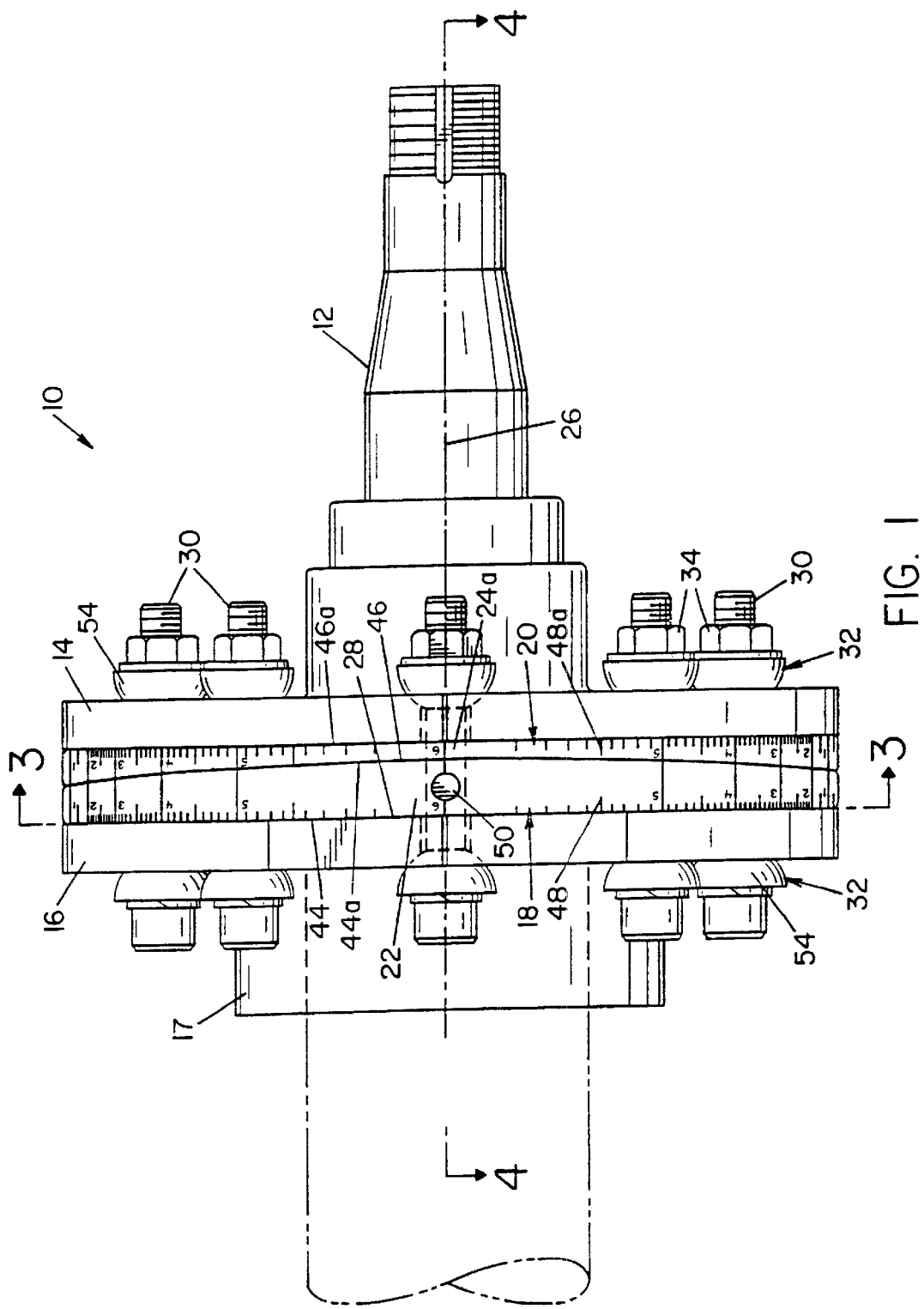
FIG. 1 illustrates a side elevational view of a spindle assembly of the invention.
Figure 2:
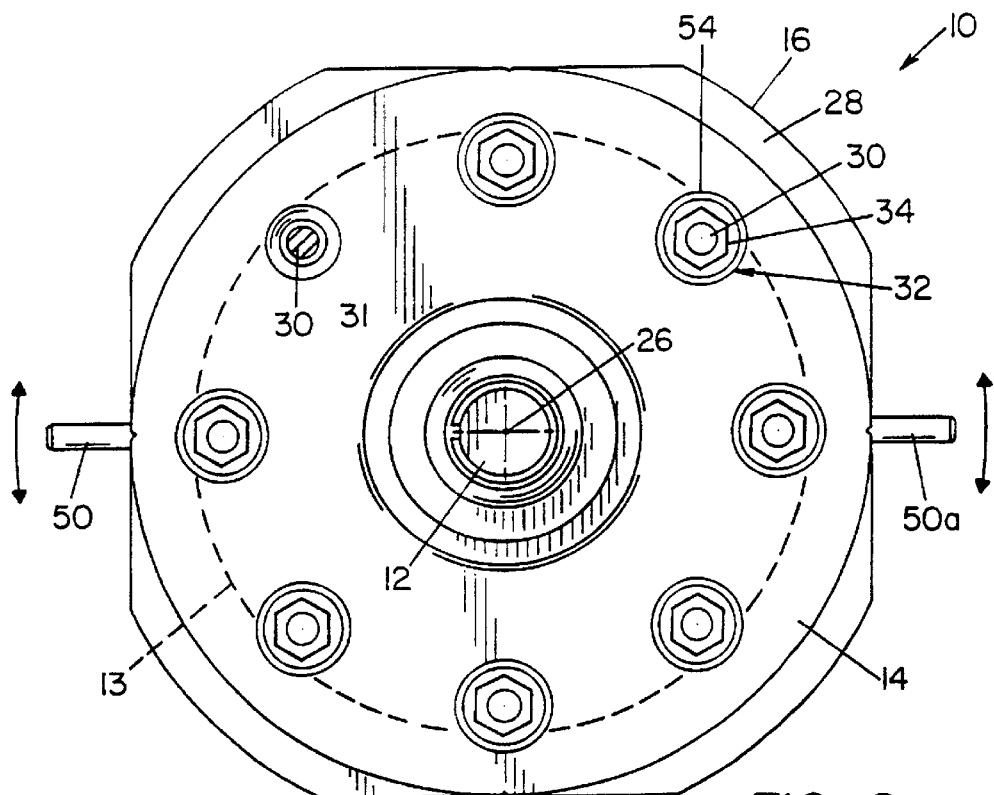
FIG. 2 illustrates an elevational view of the assembly from the spindle end.
Figure 3:
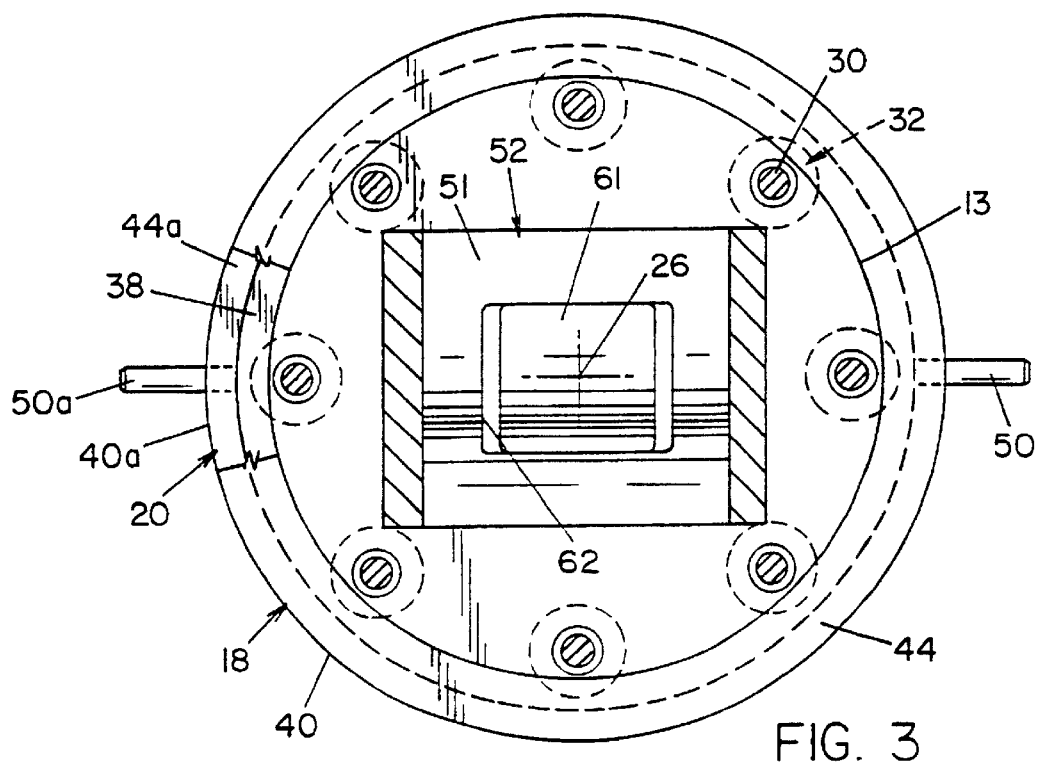
FIG. 3 illustrates a cross sectional view of a spindle assembly of the invention taken along the line 3—3 of FIG. 1.
Figure 4:
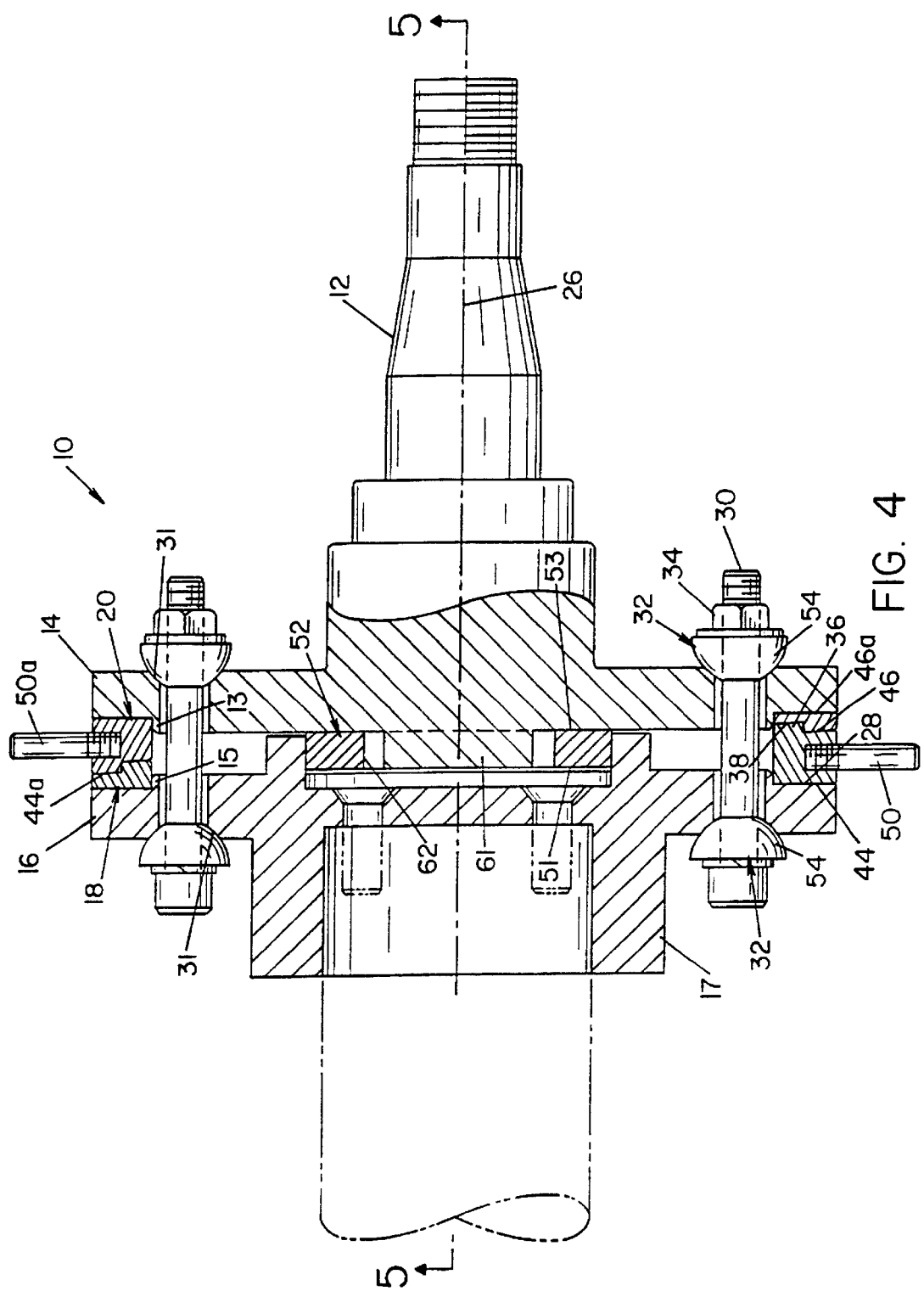
FIG. 4 illustrates a top plan view cross sectional view of a spindle assembly of the invention along the line 4—4 of FIG. 1.
Figure 5:
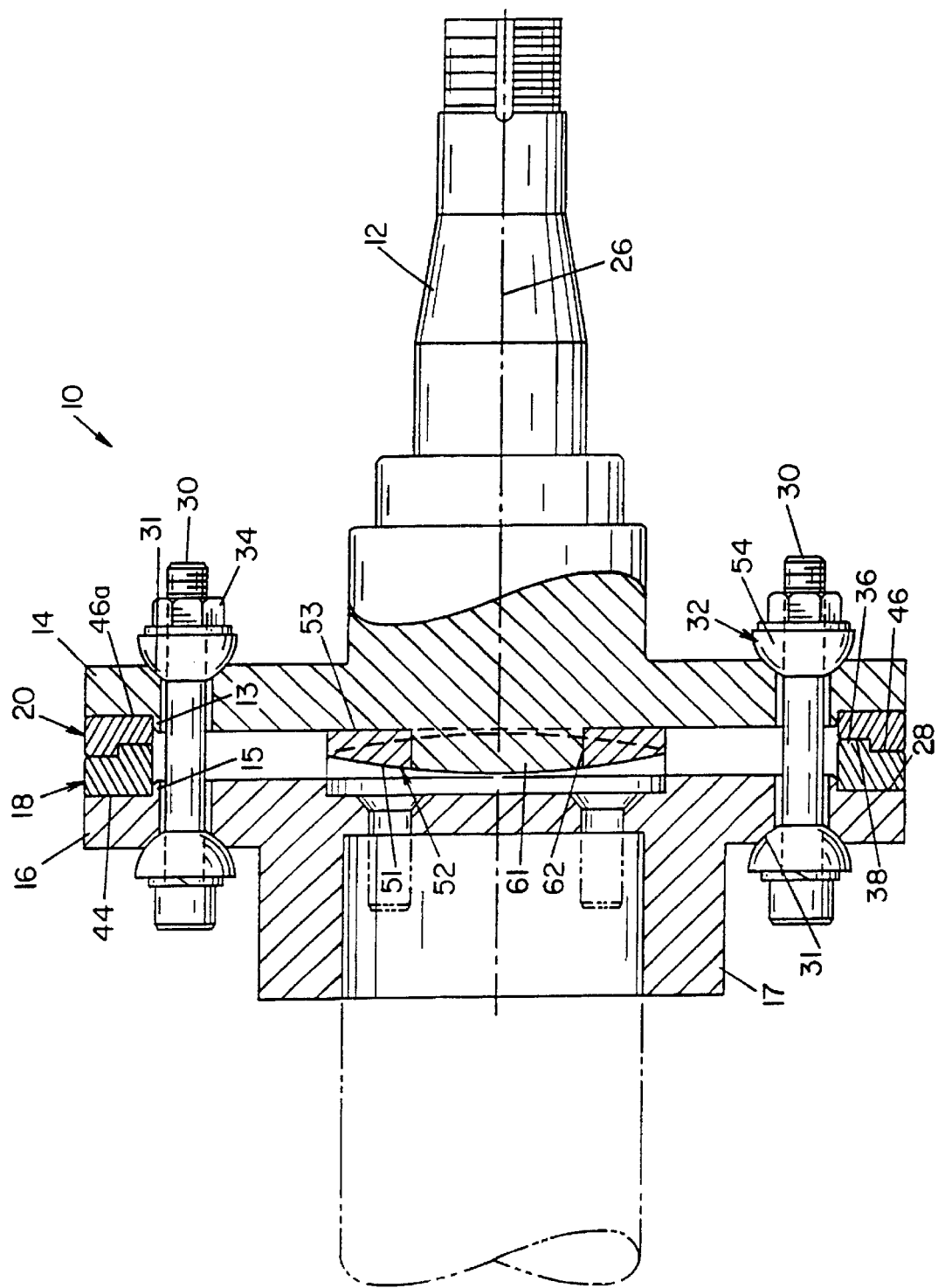
FIG. 5 illustrates a side sectional view of a spindle assembly taken along the line 5—5 of FIG. 4.

The spindle invention is designed to provide angle adjustments in whatever degree increments are desired for testing, e.g. 0.05 degrees, and is capable of substantially an infinite number of angle adjustments. The spindle assembly is composed of four principle parts, the spindle section, at least two wedge rings, and an axle section. Rotating the wedge rings causes the spindle to move in a vertical or horizontal plane to whatever angle is required for testing. The inventor has illustrated embodiments of a passenger tire spindle which uses three degree wedge rings for a plus or minus 6 degrees of adjustment, and has developed a truck tire spindle embodiment, using the same principles, which uses one and one-half degree wedge rings for a plus or minus 3 degree adjustment.

The spindle assembly of the invention is designed and illustrated specifically for use with testing equipment, but those skilled in the art will recognize that the spindle assembly can be used on vehicles where quick adjustment of the camber angle is desirable, for example on race cars.

With reference now to FIGS. 1–10, a spindle assembly 10 of the invention is illustrated. The spindle 12 is integrally connected to spindle plate 14, and spindle plate 14 is bolted to back plate 16 which is connected to the axle assembly 17. In the illustrated embodiment, eight bolts 30 having washers 32 with a spherical portion 54 are used together with nuts 34 to tightly connect back plate 16 to spindle plate 14. The spherical portion 54 of washers 32 facilitates the different angles encountered between the back plate 16 and spindle plate 14 when the angle of the spindle is adjusted, since substantially even pressure is exerted by washers 32 regardless of the angle of spindle 12.

At least two wedge rings may be interposed between the back plate 16 and the spindle plate 14 to vary the angle of spindle 12 with respect to the axle assembly 17, and especially with respect to the plane 28 of back plate 16. At least two wedge rings are needed to vary the angle of the spindle according to the invention, but additional rings may be added to provide more control to changing the angles, provide multiple planes of adjustment, or to improve the accuracy of the angles achieved.

Figure 6:
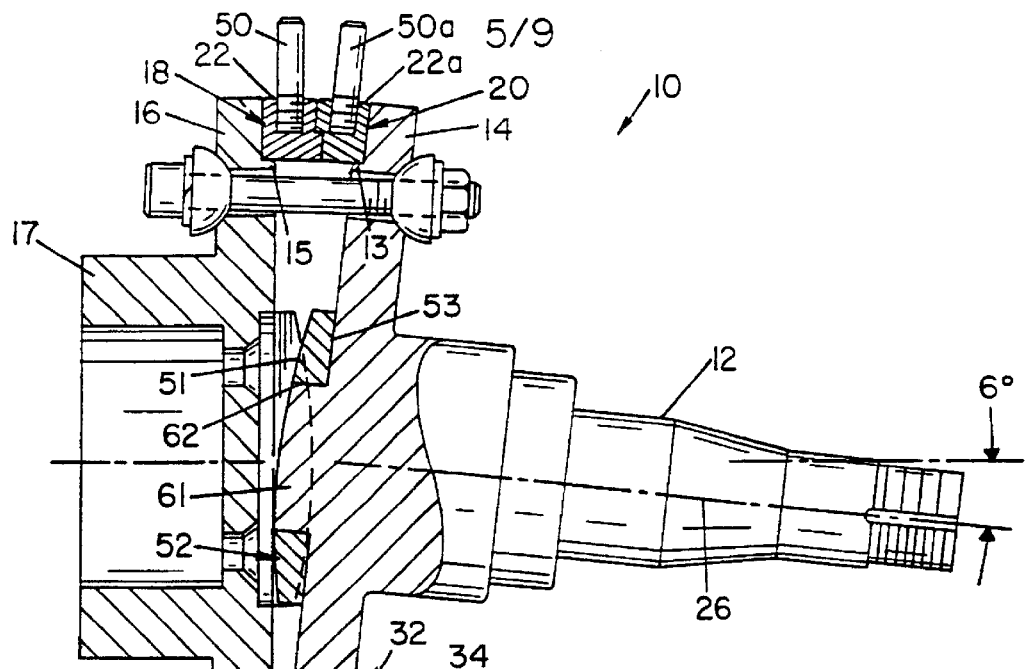
FIG. 6 is a side sectional view showing the spindle in 6° positive position.
Figure 7:
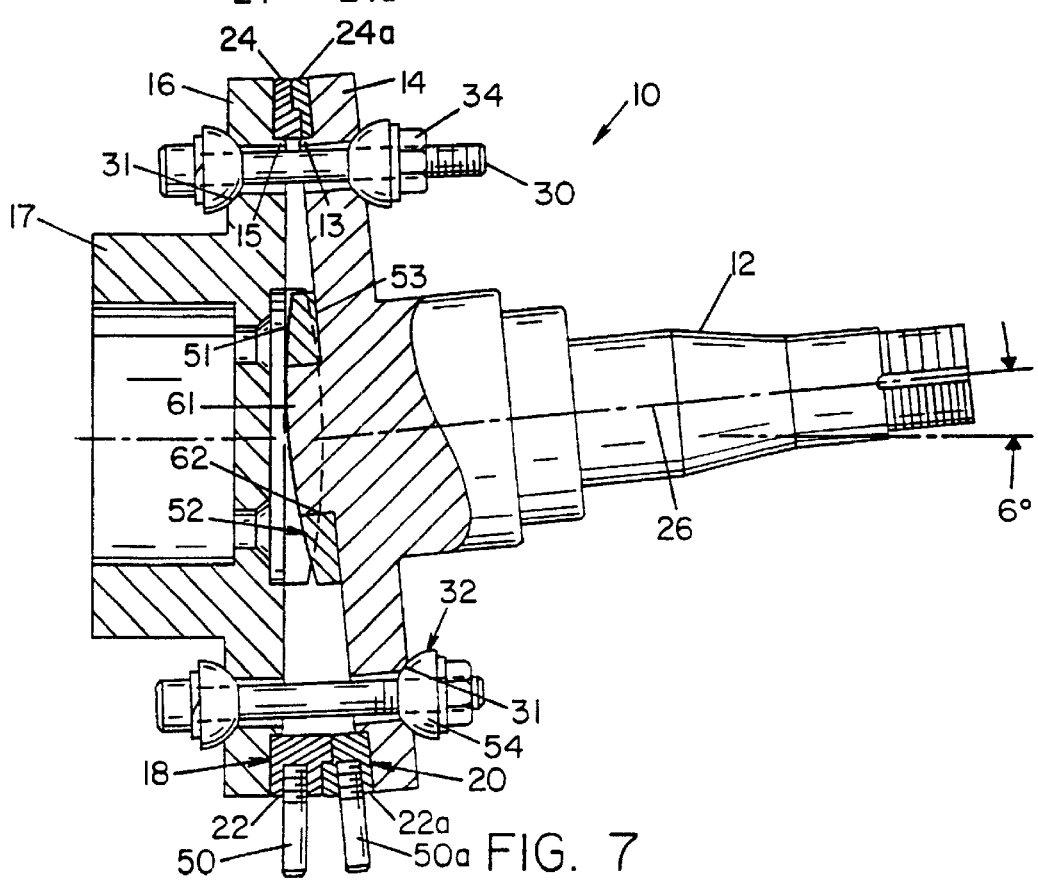
FIG. 7 is a side sectional view showing the spindle in 6° negative position.

In the illustrated embodiment a first wedge ring 18 and a second wedge ring 20 are interposed between back plate 16 and spindle plate 14. Each of the wedge rings, 18,20, has a wider portion 22,22a and a narrower portion 24,24a. When a narrower portion 24 of the first wedge ring 18 is adjacent to wider portion 22a of second wedge ring 20, the axis 26 of spindle 12 will be perpendicular to plane 28 of back plate 16. Conversely, when narrower portion 24 of first wedge ring 18 is adjacent to narrower portion 24a of second wedge ring 20, as illustrated in FIGS. 6 and 7, the maximum angle of the spindle will be seen, the position of the narrower portions 24,24a determining whether the angle will be positive or negative.

Figure 8:
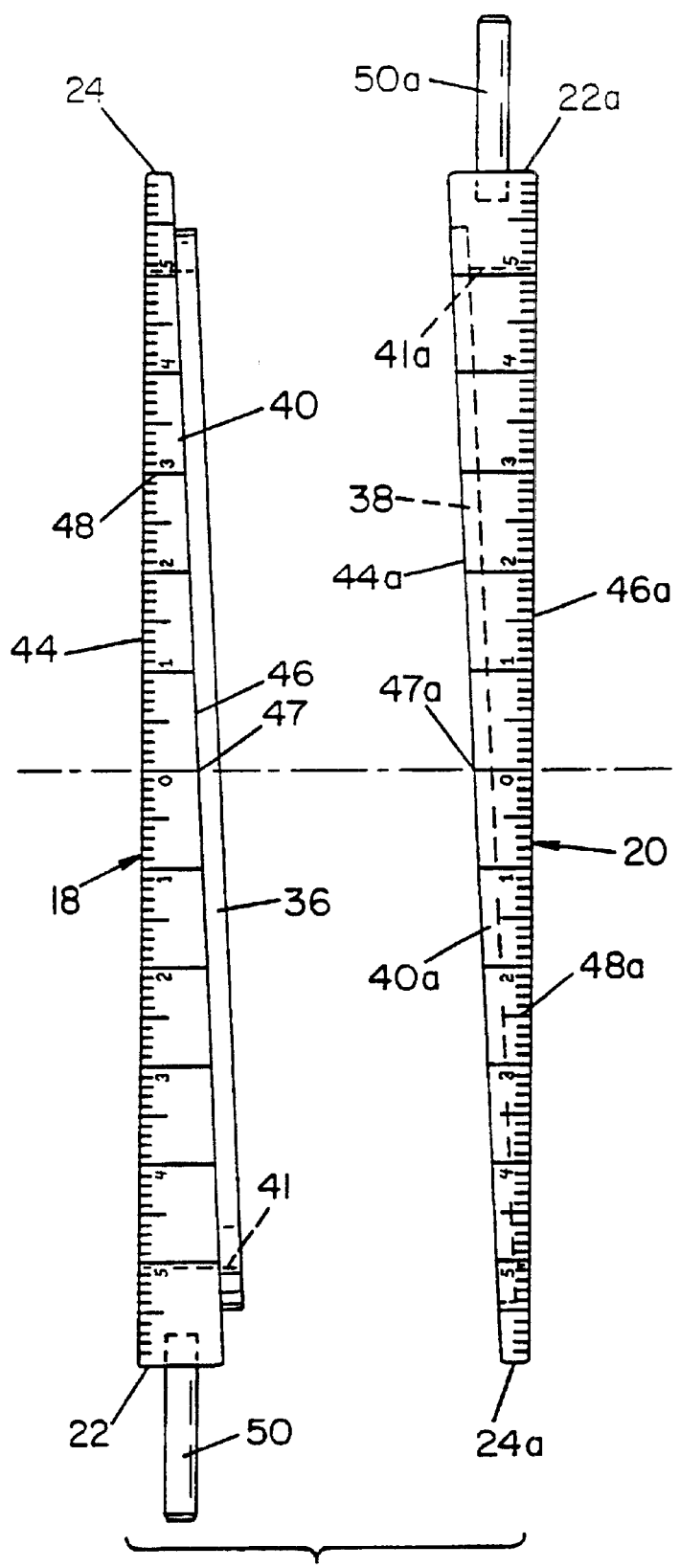
FIG. 8 is an enlarged, detached, exploded view of the wedge rings of the spindle assembly.
Figure 9:
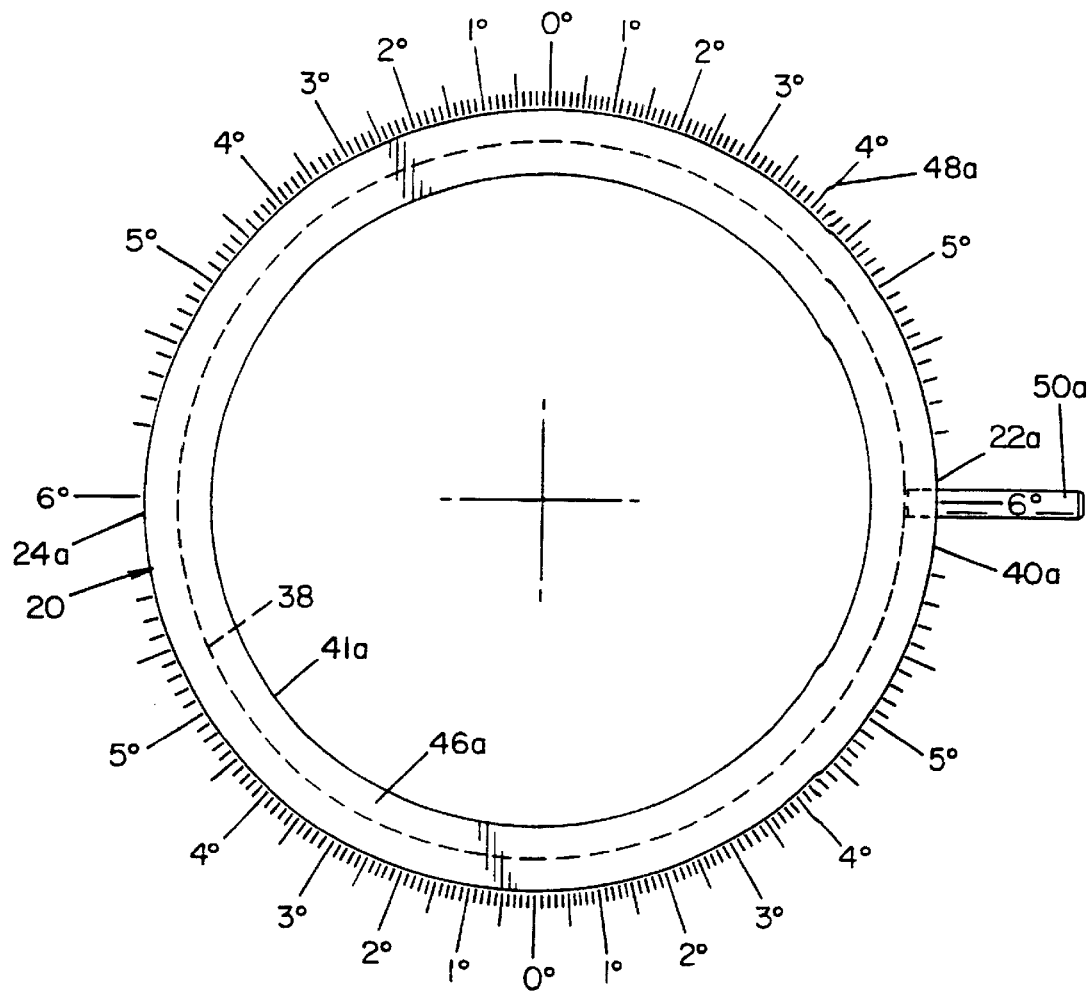
FIG. 9 is an end view of the spindle plate wedge ring showing the indicia.
Figure 10:
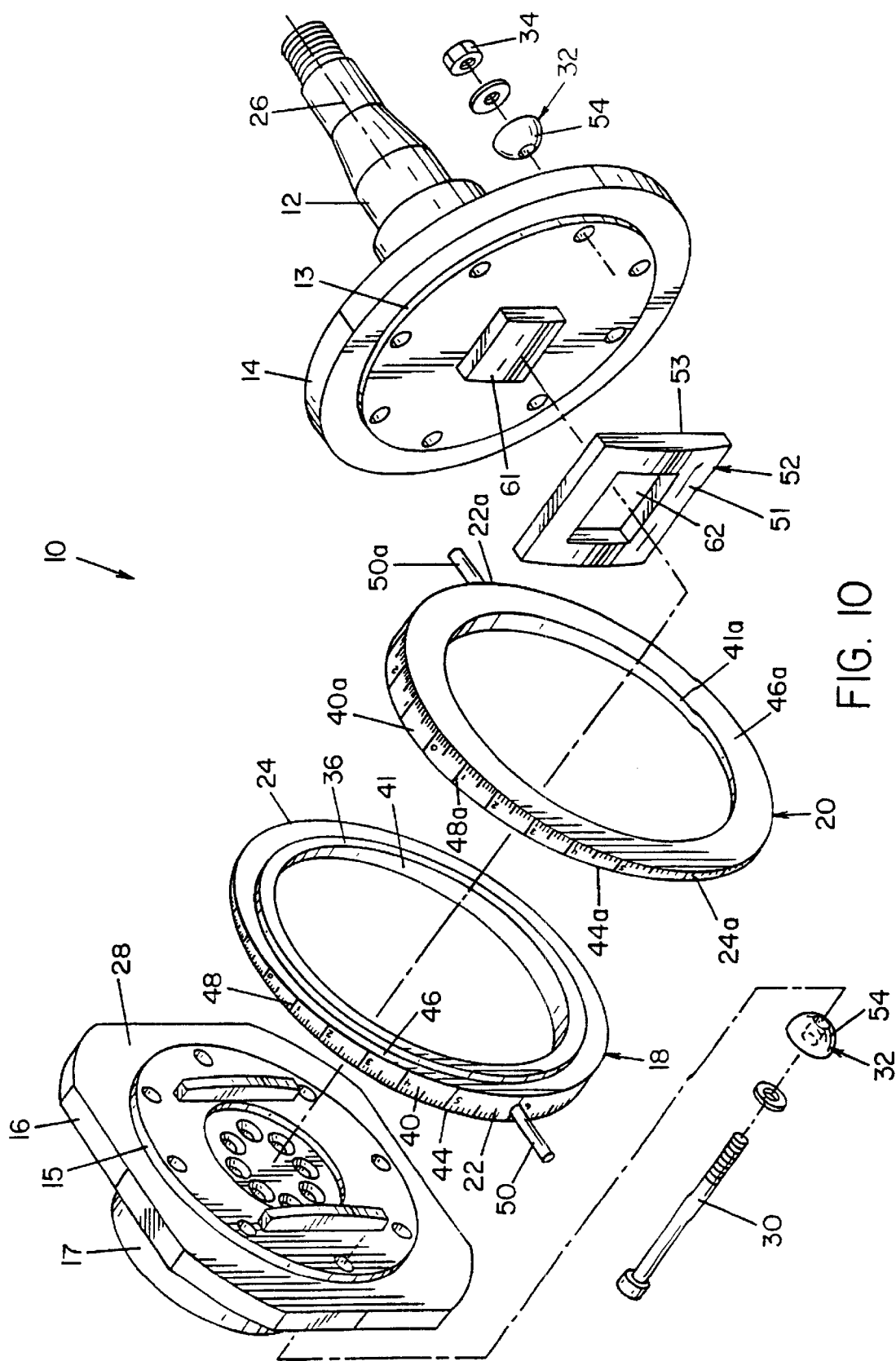
FIG. 10 is an exploded perspective view of the spindle assembly.

With reference now to FIGS. 8 and 9, a first wedge ring 18 is provided with a boss 36 which is adapted to engage register 38 of a second wedge ring 20. Wedge rings 18,20 have a wider portion 22,22a and a narrower portion 24,24a, and a back plate side 44,44a and a spindle plate side 46,46a. By "back plate side", it is meant that when the rings are installed between back plate 16 and spindle plate 14, the back plate side 44,44a is installed toward back plate 16. Likewise, "spindle plate side" means that spindle plate sides 46,46a are oriented toward spindle plate 14 when wedge rings 18 and 20 are installed between back plate 16 and spindle plate 14.

Wedge rings 18 and 20 have an outside surface 40,40a and an inside surface 41,41a. Indicia 48 is located on the back plate side 44 of wedge ring 18, and indicia 48a is located on the spindle plate side 46a of wedge ring 20. Rotating means 50,50a are used to turn the wedge rings when nuts 34 are loosened on bolts 30.

When incorporated in spindle assembly 10, the inside surface 41a of wedge ring 20 rests on shoulder 13 of spindle plate 14, and the inside surface 41 of wedge ring 18 rests on shoulder 15 of back plate 16. Shoulders 13,15 stabilize wedge rings 18,20 in the assembly, and together with boss 36 and register 38, which provide an interlocking relationship between wedge rings 18 and 20, insure that the angles indicated by indicia 48,48a are consistent as the angles of spindle 12 are changed back and forth.

In the illustrated embodiment, rotating means 50,50a are levers projecting from the outside surface 40,40a of the wedge rings 18,20, which can be used to provide leverage for turning a wedge ring when a change of camber angle for the spindle is desired. Other means of turning the wedge rings will be apparent to those skilled in the art.

In the illustrated embodiment, the outside surfaces 40,40a form a 90-degree angle with the back plate side 44 of wedge ring 18, and a 90-degree angle with the spindle plate side 46a of wedge ring 20. The center of the wedge ring is determined by measuring the center of the angled face 46 of wedge ring 18, and the angled face 44a of wedge ring 20. Determining the center of wedge ring 18,20 on the angled face places the axis point 47,47a on the angled side of the wedge ring. Thus, when wedge ring 18 and wedge ring 20 are interposed between back plate 16 and spindle plate 14, the axis points 47,47a of the two wedge rings are contiguous with each other.

The inventor has found that when the wedge rings are made such that the axis points 47,47a are on opposite sides of the wedge rings, away from each other in spindle assembly 10, the two axis points, being separated by the total width of the wedge rings, may create an oscillation in the rotation of the spindle. The invention has been found to be operable with these two separated axis points, however, when a shoe 52 is placed in the axis assembly 17, to dampen or eliminate the oscillation.

Shoe 52 is flat on spindle plate side 53, and square boss 61 on spindle plate 14 fits into register 62 of shoe 52 in spindle assembly 10. Back plate side 51 of shoe 52 is curved, to permit changing angles in the vertical plane without binding the spindle assembly 10.

The shoe 52 also allows for multiple planes of motion when an additional pair of wedge rings are used. The shoe 52 moves within the axis assembly 17 on curved back plate side 51 to allow one plane of motion, and the boss 61 on the wedge ring side of the spindle plate 14 is free to move within register 62 on the inside of the shoe 52 to allow the other plane of motion.

In the implementation of the invention, to vary the angle of the spindle, nuts 34 on bolts 30 are loosened sufficiently to permit movement or rotation of wedge rings 18 and 20, and rotation means 50,50a on the wedge rings 18,20 provide leverage for turning the rings. Marks are provided on the back plate 16 and the spindle plate 14 which are used for aligning indicia 48,48a for the desired angle. In the illustrated embodiment, if 2.5 degrees is the desired angle of the spindle, the indicia of wedge ring 18 is placed at the mark on the back plate 16 to read 2.5 degrees and the indicia 48a on wedge ring 20 is placed at the mark on the spindle plate 14 to read 2.5 degrees. Nuts 34 are then tightened on bolts 30 until the spindle assembly is secure. Spherical portion 54 of washers 32 accommodate the change in angle by providing consistent contact throughout the perimeter of bore holes 31 in the back plate 16 and spindle plate 14, regardless of the angle of adjustment.

Those skilled in the art will recognize that other systems with different indicia arrangements can be used to obtain the desired angles.

Figure 11:
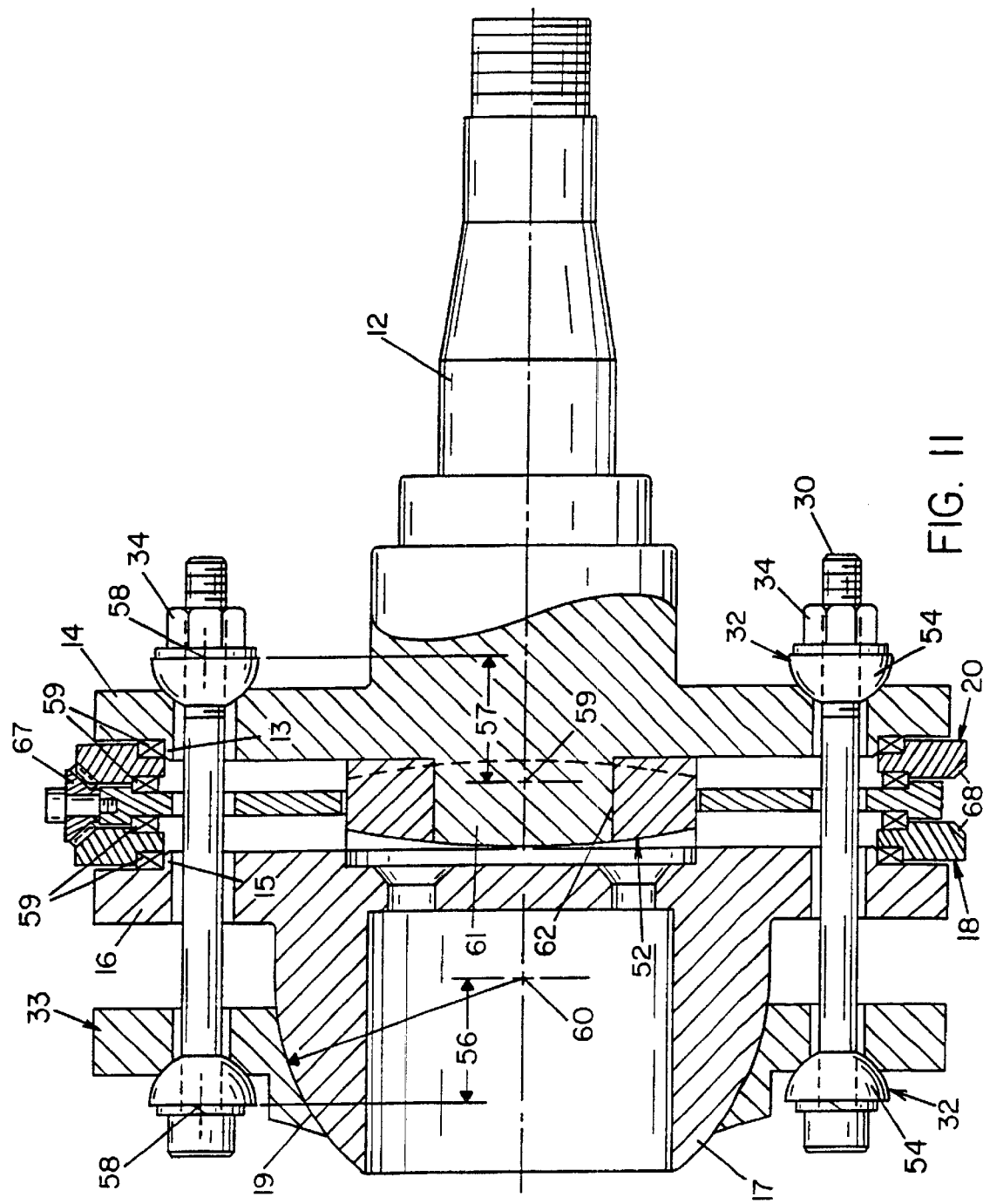
FIG. 11 illustrates a view similar to FIG. 5 showing an alternative embodiment of the invention.

With reference now to FIG. 11, in an alternative embodiment, bearings 59, such as ball bearings or roller bearings, may be mounted in wedge rings 18 and 20 to simplify and make easier rotation of the wedge rings to the desired location. An additional stabilizing plate 33 can be used to make possible changing the spindle angles without loosening bolts 30. The stabilizing plate 33 remains parallel to the spindle plate when the angle of spindle 12 is changed. Accordingly, when the angle of spindle plate 14 is changed, stabilizing plate 33 moves against surface 19 of axle assembly 17. Assuming the back plate remains stationary (attached to the axle), when the widest part of the wedges are rotated to the top of assembly 10, this would cause the spindle to turn down. When the widest part of the wedges are at the top, the top cross-section width becomes greater, and the resulting cross-section at the bottom of assembly 10 becomes narrower. When both wedge rings are rotated at the same time, the total cross section width of the wedge rings at angular displacement locations of 90° and 270° from the top of the spindle assembly 10 remain equal to each other. When the widest part of the wedges are at the top of assembly 10, this normally requires nuts 34 to be loosened to allow for the increase in cross section width. Conversely, the nuts 34 at the bottom of assembly 10 would have to be tightened to allow for the decrease in cross section width. The stabilizing plate 33 being free to move against surface 19 and remaining parallel to spindle plate 14 keeps the distance contained by bolt 30 and nut 34 constant throughout the angle adjustment of spindle 12. This arrangement makes it unnecessary to loosen or tighten the bolts as the wedge rings 18,20 are moved. It is necessary that the dimension 56 and 57 (the horizontal distance between the washer pivots 58 and the plate pivots 59,60) be the same for both plates to keep the "bolt length" equal. The radius from the plate pivot 59,60 to each of the washer pivots 58 would then be equal by design. Conical spring washers may still be required under the bolt head, or similar mechanical arrangements be made, to make up any slight irregularities and make allowances for wear, and to maintain the pre-load on the bearings. The two wedge rings would need to be coupled so that they move an equal distance simultaneously in opposite directions. This can be accomplished by using a pinion gear 67 on the centerline between the two wedge rings 18,20, and in mesh with gear teeth 68 of both wedge rings 18,20.

As illustrated above, spindle assembly 10 is designed primarily for angle adjustments in the vertical plane, i.e. ±6 degrees vertical (i.e. perpendicular to the contact testing surface of a wheel mounted on spindle 12). It is contemplated by the inventor that at least two additional wedge rings can be added to the assembly to vary the spindle angle in the horizontal plane, functioning in the same manner as wedge rings 18,20, but having an angular displacement of 90° as compared to the orientation of wedge rings 18,20. As discussed above, the dimensions of shoe 52 will permit movement of boss 61 in register 62 of shoe 52 to permit such angular displacement.

What is claimed is:

1. An adjustable spindle assembly (10) comprising a spindle (12) and a spindle plate (14) attached to a back plate (16), said spindle plate (14) and back plate (16) having interposed there between at least two wedge rings (18,20), said wedge rings (18,20) having a wider portion (22,22a) and a narrower portion (24,24a).

2. The spindle assembly (10) of claim 1 wherein when a narrower portion (24) of said wedge ring (18) is adjacent to wider portion (22a) of said wedge ring (20), an axis (26) of said spindle (12) is normal to a plane (28) of said back plate (16).

3. The spindle assembly (10) of claim 1 wherein said back plate (16) and said spindle plate (14) are attached to each other by a plurality of bolts (30) and said at least two interposed wedge rings (18,20) are free to rotate relative to said spindle plate (14) and said back plate (16) when said bolts (30) are not tightened.

4. The spindle assembly (10) of claim 1 which is adapted to vary the angle of an axis (26) of said spindle (12) relative to a plane (28) of said back plate (16) by rotating said at least two wedge rings (18,20) relative to each other and to said back plate (16).

5. The assembly of claim 4 wherein washers (32) used with bolts (30), and nuts (34) on said bolts (30) have a portion of a sphere (54) to accommodate a plurality of angles.

6. The assembly of claim 1 wherein said at least two wedge rings (18,20) are adapted to interlock with each other circumferentially, permitting rotation relative to one another while maintaining their circumferential relationship to said back plate (16).

7. The assembly of claim 1 wherein said at least two wedge rings (18,20) each have an outside surface (40,40a) corresponding to its outside diameter and an inside surface (41,41a) corresponding to its inside diameter, and a back plate side (44,44a) oriented toward said back plate (16) and a spindle plate side (46,46a) oriented toward said spindle (12), and in said assembly (10) in said wedge ring (18) closest to said back plate (16) said back plate side (44) forms a ninety degree (90°) angle with said outside surface (40), and in said wedge ring (20) closest to said spindle plate (14) said spindle plate side (46a) forms a ninety degree angle with said outside surface (40a).

8. The assembly of claim 1 wherein said at least two wedge rings (18,20) are marked with indicia (48,48a) whereby an angle of the axis (26) of said spindle (12) relative to a plane (28) of said back plate (16) can be determined by said indicia.

9. The assembly of claim 1 wherein bearings (56) are interposed between said spindle plate (14) and said wedge ring (20), and between said wedge rings (18,20), and between said wedge ring (18) and said back plate (16).

10. The assembly of claim 9 wherein a pinion gear (67) is associated with said wedge rings (18,20) for rotating said wedge rings.

11. A method for varying a camber angle of a spindle having a spindle plate comprising the steps of interposing at least two wedge rings between said spindle plate and a back plate in a spindle assembly, wherein at least two of said at least two wedge rings (18,20) have a wider portion and a narrower portion.

12. The method of claim 11 comprising the further steps of (a) releasing tension between said back plate and said spindle plate in a spindle assembly, (b) rotating at least two of said at least two wedge rings independent of each other and said back plate.

13. The method of claim 11 comprising the further steps of (a) associating a pinion gear with said wedge rings, and (b) using said pinion gear to change said angle of spindle.

14. The method of claim 11 comprising the further step of providing indicia on at least two of said at least two wedge rings whereby an exact angle of an axis of said spindle relative to a plane of said back plate can be determined from said indicia.

* * * * *